United States Patent
Berhan

(10) Patent No.: US 7,063,195 B2
(45) Date of Patent: Jun. 20, 2006

(54) DUAL CLUTCH ASSEMBLY FOR A MOTOR VEHICLE POWERTRAIN

(75) Inventor: Michael Berhan, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 10/900,092

(22) Filed: Jul. 27, 2004

(65) Prior Publication Data

US 2006/0021842 A1    Feb. 2, 2006

(51) Int. Cl.
*F16D 13/58* (2006.01)
*F16D 21/02* (2006.01)

(52) U.S. Cl. .................... 192/48.8; 74/330; 192/110 B

(58) Field of Classification Search ...................... None
See application file for complete search history.

(56) References Cited

U.S. PATENT DOCUMENTS

| | | | |
|---|---|---|---|
| 2,057,559 A * | 10/1936 | De Backer | ................. 192/48.8 |
| 3,185,274 A | 5/1965 | Maurice | |
| 3,589,483 A * | 6/1971 | Smith | ........................ 192/3.52 |
| 4,026,400 A | 5/1977 | Rawlings | |
| 4,214,653 A | 7/1980 | Slack | |
| 4,236,620 A | 12/1980 | Beccaris | |
| 4,440,281 A | 4/1984 | Hauguth | |
| 4,463,621 A | 8/1984 | Fisher | |
| 6,463,821 B1 | 10/2002 | Reed, Jr. et al. | |
| 6,698,562 B1 | 3/2004 | Teraoka et al. | |
| 6,722,483 B1 | 4/2004 | Damm et al. | |
| 2002/0060118 A1 | 5/2002 | Beneton et al. | |
| 2003/0024788 A1 | 2/2003 | Damm et al. | |
| 2003/0066728 A1 | 4/2003 | Hirt | |
| 2003/0066730 A1 | 4/2003 | Zink et al. | |
| 2003/0075412 A1 | 4/2003 | Heiartz et al. | |
| 2003/0079953 A1 | 5/2003 | Carlson et al. | |
| 2003/0085093 A1 | 5/2003 | Heiartz et al. | |
| 2003/0106767 A1 | 6/2003 | Beneton et al. | |
| 2003/0164274 A1 | 9/2003 | Feldhaus et al. | |
| 2003/0164275 A1 | 9/2003 | Feldhaus et al. | |

FOREIGN PATENT DOCUMENTS

GB            1116463            6/1968

* cited by examiner

*Primary Examiner*—Rodney H. Bonck
(74) *Attorney, Agent, or Firm*—David B. Kelley; MacMillan, Sobanski & Todd

(57) ABSTRACT

Apparatus for transmitting torque between a power source and a transmission, includes first and second coaxial input shafts, a housing, first bearing rotatably supporting the first input shaft on the housing, clutch assembly, flywheel, support shaft secured to the flywheel and located radially between the first and second input shafts, and second bearing located radially between the second input shaft and the support shaft. The clutch driveably connects and disconnects the flywheel and an input shaft.

13 Claims, 3 Drawing Sheets

DUAL CLUTCH ASSEMBLY FOR A MOTOR VEHICLE POWERTRAIN

BACKGROUND OF THE INVENTION

1. Field of the Invention

The invention relates to friction clutches. In particular the invention pertains to dual friction clutches for connecting a power source output shaft alternately to input shafts of a motor vehicle transmission.

2. Description of the Prior Art

Conventional automotive dry clutch systems are supported directly on the engine crankshaft distant from the center of mass of the system. The mass of the clutch system is cantilevered and subject to bending displacement relative to the centerline of the crankshaft. As the crankshaft rotates, the mass of the clutch system is subject to orbiting motion about the true centerline of the crankshaft. The resulting orbiting radius from the crankshaft axis and the clutch mass together induce a first order forced vibration in the powertrain, which further increases crankshaft deflection and increases load on the system.

Misalignment of the engine crankshaft centerline relative to the transmission input shaft centerline causes the surfaces of the friction discs of the clutch to wear irregularly in compliance with the misalignment. Misalignment of the clutch mass relative to the crankshaft during initial installation also contributes to the problem.

U.S. Publication US2003/0066730, dated Apr. 10, 2003, describes an example of a clutch assembly installed between a drive unit and a transmission having a transmission input shaft to transmit torque between the drive unit and the transmission. The clutch and a portion of the clutch actuation system hardware are supported on an engine crankshaft. The clutch mass is cantilevered a substantial distance from the crankshaft support across a space occupied by the clutch and its actuators.

Automotive torque converter systems conventionally are secured to the engine crankshaft with a compliant or flexible member, which allows axial and bending displacement, and are supported on the transmission by a single bushing or bearing. The partially supported cantilevered mass of the torque converter, due to bending or flexing and whirl of the crankshaft, rotates in an orbiting motion about the true centerline of the crankshaft. The resulting orbit radius and the torque converter mass induce a first order vibration in the powertrain, which increases the crankshaft deflection and resulting loads. But misalignment of the engine crankshaft centerline relative to the transmission input shaft centerline is accommodated by compliance within a compliant, flexible member located in a torque-transmitting path between the crankshaft and torque converter. Misalignment of the torque converter mass relative to the crankshaft during installation and misalignment of the transmission support relative to the engine crankshaft centerline contribute to the vibration.

There is need to support the rotating clutch mass on a secure surface, preferably a surface that is aligned with the axis of the crankshaft axis. The support should substantially reduce or eliminate displacement of the clutch mass relative to the axis of rotation during installation and in service. The structural support preferably would eliminate the cantilevered nature of the support currently provided to the clutch mass. Instead, the weight of the clutch assembly would be supported at both opposite axial sides of the rotating clutch mass.

SUMMARY OF THE INVENTION

A clutch assembly according to this invention requires less mass, rotating inertia and packaging space compared to conventional clutch support arrangements.

The entire clutch assembly mass is fully supported on an output shaft of the power source and by bearings or bushings mounted on a transmission housing. This mounting arrangement provides stable support for the clutch and reduces the effects of crankshaft whirl and misalignment of the crankshaft relative to the transmission. Powertrain noise, vibration, and harshness are improved due to the reduction in first order imbalance forces.

Engine power is transmitted to the clutch system by a flexible disc or coupling that allows for radial and angular misalignment of the engine crankshaft relative to the clutch assembly. The flexible disc, however, provides sufficient axial strength to transmit clutch actuation forces to a crankshaft thrust bearing as well as to transmit torque between the crankshaft and the clutch.

In one embodiment, one or more bearings support the clutch assembly mass on a housing located at an axial side of the clutch assembly near the housing and axially opposite the engine crankshaft. In this way, the clutch mass is provided with two axially spaced supports. A bearing, located radially between an input shaft and a shaft supporting a portion of the clutch assembly mass, is provided to support the clutch assembly on the input shafts, which are supported on the housing.

Additional support may be provided by a second bearing or bushing located between an axial location of the housing support bearing and an axial location of the clutch assembly. The bushing may be in running contact with clutch assembly support shaft and an input shaft, or it may have clearance with the input shaft such that it provides a reaction only when deflection of the clutch assembly support shaft exceeds a limit displacement that requires additional support.

A powertrain assembly according to this invention for transmitting torque between a power source and a transmission first and second coaxial input shafts, a housing, a first bearing rotatably supporting the first input shaft on the housing, a clutch assembly, a support shaft secured to the clutch assembly and located radially between the first and second input shafts, a second bearing located radially between the second input shaft and the support shaft. A first clutch driveably connects and disconnects the clutch assembly and the first input shaft.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
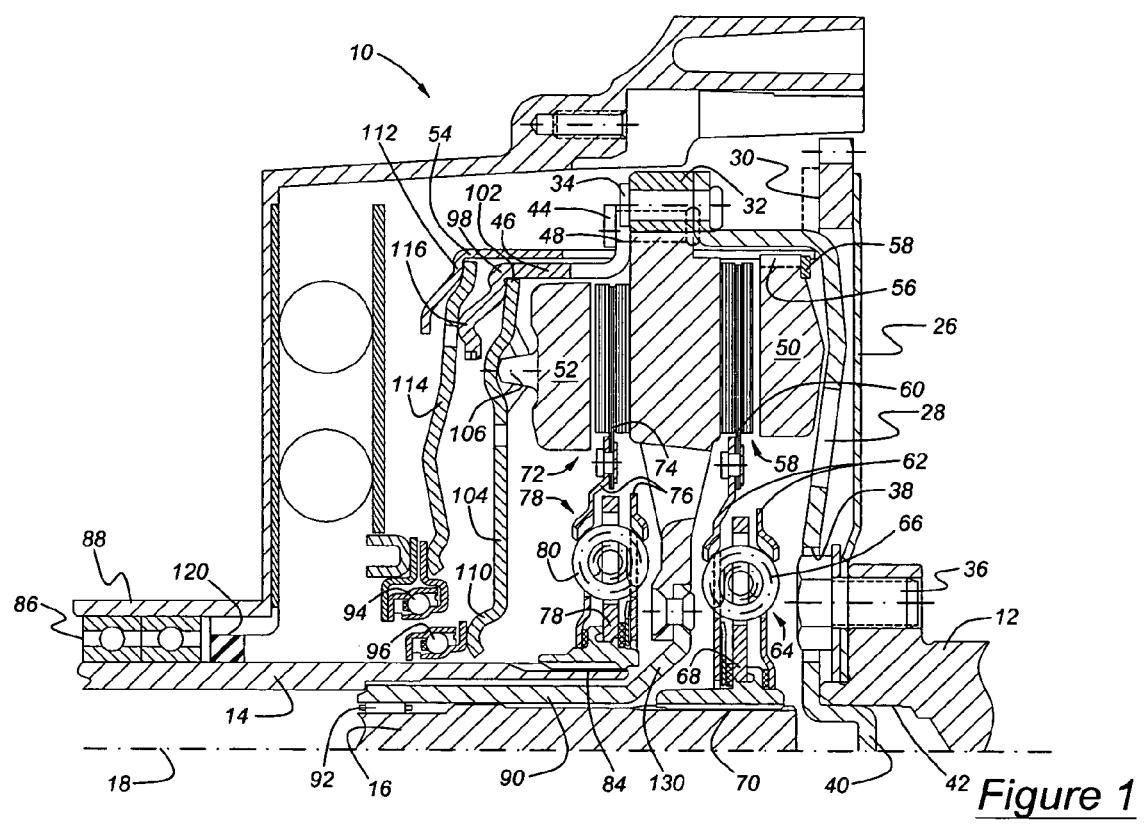
FIG. 1 is a side elevation cross section showing a dual dry clutch assembly arranged in a drive path in which torsion is transmitted between an engine crankshaft and two input shafts.

Referring now to the drawings, there is illustrated in FIG. 1 a dual clutch assembly 10 for transmitting power between an engine crankshaft 12 and first and second transmission input shafts 14, 16 alternately. Shaft 12 may be an output shaft driven by a power source such as an electric motor or hydraulic motor. Input shaft 14 may be a sleeve shaft. Input shaft 16 may be a solid shaft coaxial with shaft 12 and located within the sleeve shaft along at least a portion of its length. The transmission input shafts 14, 16 are driveably connected to gearing that produces various ratios of the speed of a transmission output shaft and the speed of the input shafts. The dual clutch assembly 10 and the input shafts are arranged about a longitudinal axis 18.

The crankshaft 12 carries a flex plate 26, a relative thin, resilient, flexible disc secured to a flywheel support disc 28 near the radial outer periphery 30 of the flex plate. A flywheel 32 is secured to the flywheel support disc 28 by rivets 34, spaced angularly in a circle about axis 18. The flex plate is secured to the crankshaft 12 by bolts 36, which are also spaced angularly about axis 18 and engage tapped holes formed in the end face of the crankshaft. Flex plate 26 transmits torque between crankshaft 12 and flywheel 32 through the bolts 36, flywheel support disc 28, and rivets 34.

The flywheel support disc 28 is formed with clearance holes 38, each hole located at a head of a bolt 36, and a circular bead or boss 40, which is seated in a pilot recess 42, formed at an axial end of the crankshaft 12. The flywheel support disc 28 pilots the clutch assembly 10 onto crankshaft 12 and supports the clutch assembly at a forward side of the flywheels on the crankshaft. The clutch assembly is also supported at a rearward location by a bearing in a housing, as shown in FIGS. 1–4 and 6. The flex plate 26 deflects readily along the axis 18 to accommodate axial movement of the flywheel 32 relative to the crankshaft 12, but the flex plate transmits torque to flywheel support disc 28 in a relatively stiff plane normal to axis 18.

A second group of rivets 44 secures the flywheel 32 to a pressure plate cover 46, which includes a leg 48 turned radially outward and located between a head of each rivet 44 and the adjacent face of the flywheel 32.

The flywheel 32 is located axially between a first pressure plate 50 and a second pressure plate 52. The first pressure plate 50 is rotatably connected to apply cylinder 54 by a spline 56, formed on the radially outer periphery of the pressure plate. The spline 56 permits axial displacement of pressure plate 50 relative to flywheel 42. A snap ring 58, fitted in a recess in the apply cylinder 54, secures the apply cylinder to the pressure plate 50 so that the apply cylinder and pressure plate 50 move axially as a unit.

The pressure plates 50, 52 are attached and driveably connected to flywheel 32 by drive straps or drive links (not shown) so that pressure plates 50, 52 rotate as a unit with flywheel 32. The drive links or drive straps are of the type conventionally used for this purpose in a dual clutch assembly for a motor vehicle powertrain.

A first clutch 58, which preferably includes a clutch disc 60, but may include a stack of thin clutch discs located in space between the flywheel 32 and pressure plate 50, is driveably connected to a housing 62 of a torsion damper 64 containing helical coiled compression springs 66, which are arranged in a annular space around axis 18 and surrounded by the housing 62. A radially directed damper plate 68, secured by a spline 70 to input shaft 16, extends radially into a space between adjacent damper springs 66 and is located close to an end of each adjacent spring. Torsional displacement of the clutch disc 60 relative to input shaft 16 causes the housing 62 and springs 66 to rotate relative to the plate 68. The springs contact the damper plate, are compressed due to this contact, and frictionally engage the damper housing 62 as they compress. In this way, the damper 64 stores torsional energy in the springs and dissipates, through frictional contact of the springs and the housing, some of the torsional energy transmitted between the clutch disc 60 and input shaft 16. Torsion damper 64 connects clutch disc 60 and input shaft 16, and attenuates torsional vibrations between those components.

A second clutch 72, which preferably includes a clutch disc 74, but may include a stack of thin clutch discs located in a space between the flywheel 32 and pressure plate 52, is driveably connected to a housing 76 of a torsion damper 78 containing helical coiled compression springs 80, which are arranged in a annular space around axis 18 and surrounded by the housing 76. A radially directed damper plate 82, secured by a spline 84 to input shaft 14, extends radially into a space between adjacent damper springs 80. The torsion damper 78 connects clutch disc 74 and input shaft 14, and attenuates torsional vibrations between those components.

Crankshaft 12 is supported for rotation on bearings (not shown) located in the engine block. The input shafts 14, 16 are rotatably supported on a clutch support bearing 86, which is pressed into a recess formed in a housing 88, such as a housing enclosing the clutch assembly 10, or a transmission housing, in which the gearing, shafts, synchronizers and other control elements of the transmission are located. Bearing 86 is preferably an anti-friction bearing having an outer race fitted in housing 88, an inner race fitted on input shaft 14, and a set of balls or rollers retained in a cage, located between, and contacting the inner and outer races. Bearing 86 may include a pair of axially adjacent bearings of these types, as shown in the figures.

The flywheel 32 is mechanically connected to a clutch assembly support shaft 90, which extends axially toward housing 88. A bearing 92, located in an annular space between the outer surface of input shaft 16 and the inner surface of the clutch assembly shaft 90, supports shaft 90 for rotation relative to shaft 16. Preferably, bearing 92 is an anti-friction needle bearing.

The flywheel 32 and pressure plates 50, 52, therefore, have a forward support on the crankshaft 12 and engine block, and a rearward support on input shafts 14 and 16, bearings 86 and 92, and housing 88. The clutch discs 60, 74 and torsion dampers 64, 72 are supported on input shafts 14, 16, bearing 86, and housing 88.

First and second throw-out bearings 94, 96 electro-mechanically apply and release alternately the first and second clutches 58, 72, respectively.

The pressure plate cover 46 is formed with an annular bead 98, which contacts the radial end 102 of a clutch apply lever 104. Pressure plate 52 is formed with an protrusion 106, which contacts the adjacent surface of apply lever 104. The radial inner periphery of lever 104 is formed with an annular bead 110, which contacts throw-out bearing 96.

Similarly, clutch apply cylinder 54 is formed with an annular bead 112, which contacts the radial periphery of a second clutch apply lever 114. Pressure plate cover 46 is formed with another annular bead 116, which is held in contact with a surface of the second clutch apply lever 114. The radial inner periphery of clutch apply lever 114 is held in contact with throw-out bearing 94.

Clutch apply levers 104, 114 are preferably Belleville springs formed and located as described and illustrated. The elastically resilient nature of the clutch apply levers 104, 114 maintains them in contact with the surfaces of the apply cylinder 54, pressure plate cover 46, and pressure plate 52, and the throw-out bearings 92, 94.

In operation, the clutch 58 is engaged by applying a force to throw-out bearing 92, which has an axial component directed leftward. In response to this actuating force, clutch apply lever 114 applies at bead 112 an axial force directed rightward on apply cylinder 54, due to its contact with bead 116. Cylinder 54 transmits the rightward directed axial force to pressure plate 50, causing the clutch disc 60 frictionally to engage both the flywheel 32 and pressure plate 50, thereby engaging clutch 58. When the actuating force is removed from throw-out bearing 94, frictional engagement of the clutch disc 60 with the flywheel 32 and pressure plate 50 is discontinued, and clutch 58 disengages.

Clutch 72 is engaged by applying a leftward force to throw-out bearing 96. That actuating force is reacted by a rightward axial force applied to bead 98 of clutch pressure plate cover 46 and a leftward axial force applied to the protrusion 106 on pressure plate 52. The force on pressure plate 52 forces the clutch disc 74 frictionally to engage both the flywheel 32 and pressure plate 52, thereby engaging clutch 72. When the actuating force is removed from throw-out bearing 96, frictional engagement of the clutch disc 74 with the flywheel 32 and pressure plate 52 is discontinued, and clutch 72 disengages.

The space occupied by the clutches 58, 72 is sealed from the interior of the housing 24 against the passage of lubricating oil or automatic transmission fluid by several seals. Seal 120 is fitted in a recess on the outer surface of input shaft and contacts the housing 88. Seal 122 is fitted in a space between the inner surface of input shaft 14 and the outer surface of input shaft 16.

In the clutch assembly 10 of FIG. 1, the clutch assembly support shaft 90 transmits to the input shafts 14, 16 a radial force induced by centrifugal force, and potentially a moment due to the overhung mass of the flywheel 32. The moment is reacted in part by support provided at the crankshaft 12 and at the housing 88 using one bearing 92 located axially between the flywheel 32 and bearing 86 and radially between the clutch assembly support shaft 90 and the input shaft 16. Under service conditions, clearances, flexure, tolerances and misalignment among the components may require additional support of the clutch assembly shaft 90. Additional support may be provided by a second bearing or bushing located between an axial location of bearing 86 and an axial location of flywheel 32. The bushing may be in running contact with shaft 90 and an input shaft, or it may have clearance with the input shaft such that it provides a reaction there only when deflection of the clutch assembly support shaft 90 exceeds a limit requiring additional support.

For example, bearing 92 may be located axially adjacent the conical portion 130 of clutch assembly support shaft 90 and radially between shaft 90 and input shaft 16, thereby reducing the axial distance between the flywheel 32 and the bearing 92. Or an additional bearing can be located adjacent bearing 92 axially between the flywheel 32 and bearing 86 and radially between the clutch assembly support shaft 90 and input shaft 16.

Figure 2:
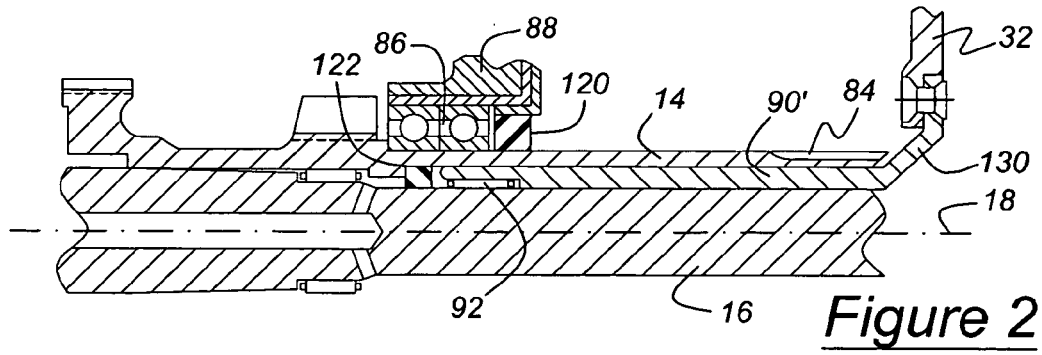
FIG. 2 is a side elevation cross section showing an embodiment in which a clutch assembly support shaft bearing is located near a bearing in the housing.
Figure 3:
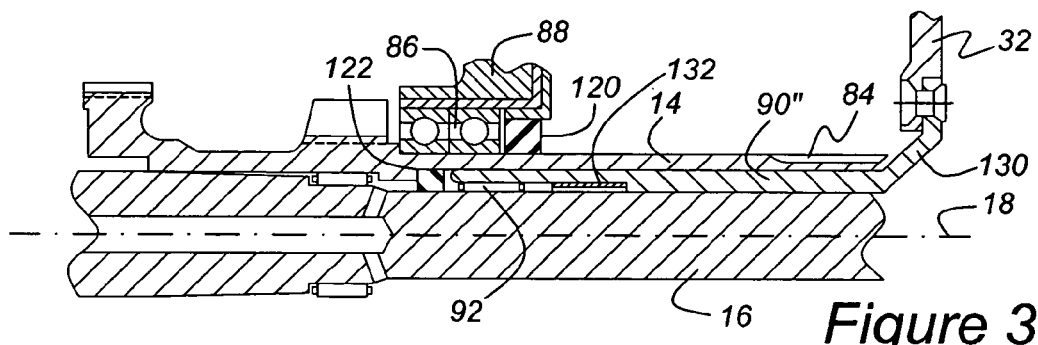
FIG. 3 is a side elevation cross section showing a bushing used in combination with the clutch assembly support shaft bearing of FIG. 2.
Figure 4:
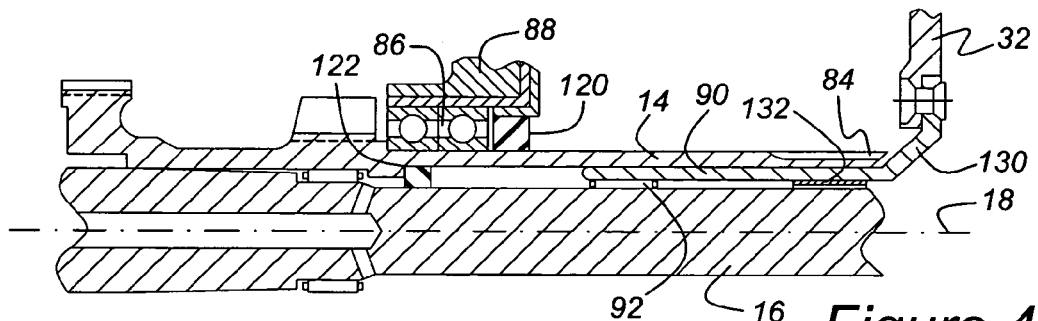
FIG. 4 is a side elevation cross section showing a clutch assembly support shaft bearing and bushing located nearer the flywheel than in the assembly of FIG. 3.

FIGS. 2–4 illustrate alternate techniques for supporting shaft 90. FIG. 2 shows bearing 92 at an end of shaft 90' located along axis 18 nearer to bearing 86 than its location in FIG. 1. An additional needle bearing can be located axially adjacent bearing 92 in FIG. 2 between the flywheel 32 and needle bearing 92.

Figure 5:
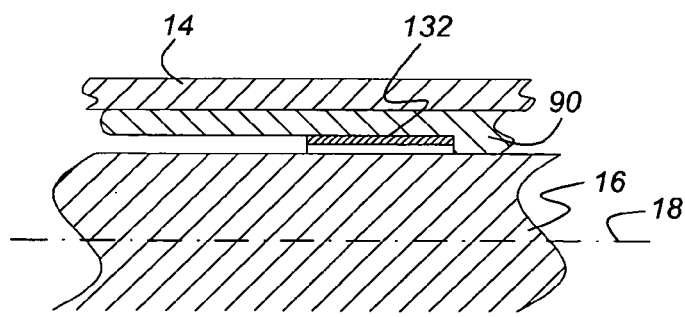
FIG. 5 is a side elevation cross section showing in a larger scale the bushing installed as in FIGS. 3 and 4.
Figure 6:
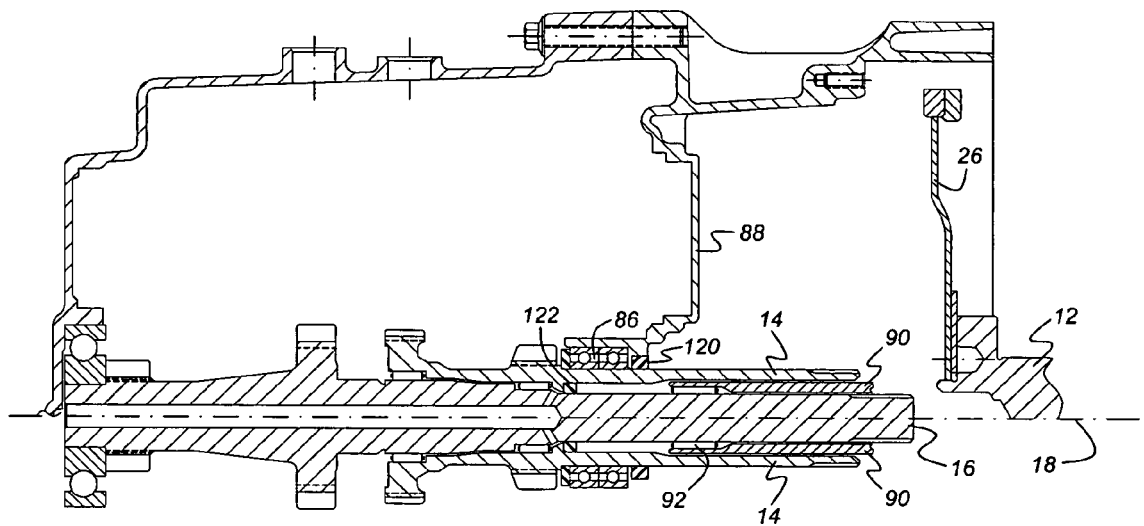
FIG. 6 is a side elevation cross section showing the crankshaft, clutch assembly support shaft bearing, bushing and input shafts installed in a housing.

FIG. 3 shows a bushing 132 located radially adjacent bearing 86 at the end of shaft 90". The outer surface of bushing 132 is preferably press fitted on the radially inner surface of input shaft 14, but the inner surface of the bushing is spaced radially from the outer surface of input shaft 16, as illustrated in FIG. 5. Therefore, the bushing 132 produces a reaction force on shaft 90 only if the deflection of shaft 90 at the bushing reaches the radial clearance between the bushing and shaft 16. An additional bearing can be located axially adjacent the location of bearing 92 in FIG. 2 and axially between the flywheel 32 and bearing 86.

Alternatively, the bushing 132 of FIG. 3 may be located axially adjacent the conical portion 130 of clutch assembly support shaft 90 and radially between shaft 90 and input shaft 16.

FIG. 4 shows bearing 92 located in the position of FIG. 1 and the bushing 132 located axially adjacent the conical portion 130 of shaft 90. In each instance, the outer surface of bushing 132 is press fitted on the radially inner surface of input shaft 14, but the inner surface of the bushing is spaced radially from the outer surface of input shaft 16.

The transmission whose input shafts 14, 16 are driveably connected by the clutches 58, 72 may be a transmission having multiple layshafts or countershafts, each associated with an alternate speed ratio produced by the transmission. To produce each speed ratio, a synchronizer or coupler prepares a drive path associated with the oncoming speed ratio, one input clutch is engaged, the other input clutch is disengaged, and a synchronizer decouples the offgoing speed ratio. A transmission of this type is described in U.S. Pat. No. 4,463,621, dated Aug. 7, 1984, which is assigned to the Assignee of the present invention. The entire disclosure of U.S. Pat. No. 4,463,621 is incorporated herein by reference.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Apparatus for transmitting torque between a power source and a transmission, comprising;
   first and second coaxial input shafts;
   a housing;
   a first bearing rotatably supporting the first input shaft on the housing;
   a flywheel;
   a support shaft secured to the flywheel and located radially between the first and second input shafts;
   a second bearing located radially between the second input shaft and the support shaft;
   a first clutch for driveably connecting and disconnecting the flywheel and the first input shaft;
   an output shaft driveably connected to the power source;
   a flywheel support disc piloted on the output shaft at a first axial side of the flywheel, and secured to the flywheel; and a flex plate secured at a radially inner attachment to the output shaft, extending radially from the output shaft, and secured to the flywheel support disc at a radially outer location, whereby the flywheel is driveably connected to the output shaft.

2. The apparatus of claim 1, further comprising:
a second clutch for driveably connecting and disconnecting the flywheel and the second input shaft.

3. The apparatus of claim 1, wherein the flex plate is located at a first axial side of the flywheel.

4. The apparatus of claim 1, wherein the flex plate is located at a first axial side of the flywheel; and
the first bearing is located at a second axial side of the flywheel opposite the first side.

5. The apparatus of claim 1, further comprising:
an output shaft driveably connected to a power source, formed with a guide surface aligned with an axis of an output shaft; and
a flywheel support disc secured to the flywheel, formed with a surface complementary to the guide surface and seated on the guide surface.

6. The apparatus of claim 1, further comprising:
a first torsion damper driveably connected to the first input shaft and the first clutch.

7. The apparatus of claim 1, further comprising:
a second clutch for driveably connecting and disconnecting the flywheel and second input shaft;
a first torsion damper driveably connected to the first input shaft and the first clutch; and
a second torsion damper driveably connected to the second input shaft and the second clutch.

8. The apparatus of claim 1, wherein the first clutch further comprises:
a first pressure plate supported for displacement relative to the flywheel;
a first clutch disc located between the flywheel and the first pressure plate, for frictionally engaging and disengaging the flywheel and the first pressure plate, in response to displacement of the first pressure plate; and
a first mechanism for displacing the first pressure plate relative to the flywheel.

9. The apparatus of claim 1, wherein the first clutch further comprises:
a first pressure plate supported for displacement relative to the flywheel;
a first clutch disc located between the flywheel and the first pressure plate, for driveably engaging and disengaging the flywheel and the first pressure plate in response to displacement of the first pressure plate; and
a first mechanism for displacing the first pressure plate relative to the flywheel; and further comprising a second clutch that includes:
a second pressure plate supported for displacement relative to the flywheel;
a second clutch disc located between the flywheel and the second pressure plate, for driveably engaging and disengaging the flywheel and the second pressure plate in response to displacement of the second pressure plate; and
a second mechanism for displacing the second pressure plate relative to the flywheel.

10. The apparatus of claim 9 further comprising:
a first torsion damper driveably connected to the first input shaft and the first clutch disc; and
a second torsion damper driveably connected to the second input shaft and the second clutch disc.

11. A powertrain, comprising:
a first and second input shafts;
a housing;
a first bearing rotatably supporting the first input shaft on the housing;
a flywheel;
a support shaft secured to the flywheel and located radially between the first and second input shafts;
a second bearing located radially between the second input shaft and the support shaft;
a first clutch for driveably connecting and disconnecting the flywheel and the first input shaft;
a second clutch for driveably connecting and disconnecting the flywheel and the second input shaft; and
wherein the second bearing further comprises first and second needle bearings located radially between the second input shaft and the support shaft, the first needle bearing being located axially at an axial location of the first bearing, the second needle bearing being located axially between an axial location of the first bearing and an axial location of the flywheel.

12. The powertrain of claim 11, wherein:
the first clutch further comprises a first pressure plate supported for displacement relative to the flywheel, a first clutch disc located between the flywheel and the first pressure plate, for frictionally engaging and disengaging the flywheel and the first pressure plate, in response to displacement of the first pressure plate, and a first mechanism for displacing the first pressure plate relative to the flywheel; and
the second clutch further comprises a second pressure plate supported for displacement relative to the flywheel, a second clutch disc located between the flywheel and the second pressure plate, for driveably engaging and disengaging the flywheel and the second pressure plate in response to displacement of the second pressure plate, and a second mechanism for displacing the second pressure plate relative to the flywheel.

13. The powertrain of claim 12, further comprising:
a first torsion damper driveably connected to the first input shaft and the first clutch disc; and
a second torsion damper driveably connected to the second input shaft and the second clutch disc.

* * * * *